United States Patent
Fix et al.

(10) Patent No.: US 6,219,363 B1
(45) Date of Patent: Apr. 17, 2001

(54) METHOD OF FREQUENCY CONVERSION OF THE RADIATION OF A PULSED OPTICAL PARAMETRIC OSCILLATOR (OPO) AND DEVICE FOR EXECUTING THE METHOD

(75) Inventors: Andreas Fix; Martin Wirth, both of Munich (DE)

(73) Assignee: Deutsches Zentrum fur Luft-und Raumfahrt e.V., Bonn (DE)

(*) Notice: Subject to any disclaimer, the term of this patent is extended or adjusted under 35 U.S.C. 154(b) by 0 days.

(21) Appl. No.: 09/301,686

(22) Filed: Apr. 29, 1999

(30) Foreign Application Priority Data

Apr. 29, 1998 (DE) .............................................. 198 19 178

(51) Int. Cl.[7] .................................................. H01S 3/10
(52) U.S. Cl. .............................. 372/22; 372/22; 359/328; 359/330
(58) Field of Search ........................ 372/22, 92; 359/328, 359/330

(56) References Cited

U.S. PATENT DOCUMENTS

| | | | | |
|---|---|---|---|---|
| 5,278,852 | * | 1/1994 | Wu et al. | 372/22 |
| 5,390,211 | * | 2/1995 | Clark et al. | 372/92 |
| 5,781,571 | * | 7/1998 | Nabors et al. | 359/339 |
| 5,786,929 | * | 7/1998 | Nabors | 359/330 |

OTHER PUBLICATIONS

Shirakawa et al., "Highly efficient generation of blue-orange femtoseconds pluses from intracavity–frequency mixed optical parametric oscillator", *Optics Communications*, vol. 123, pp. 121–128, (1996).

* cited by examiner

Primary Examiner—Leon Scott, Jr.
(74) Attorney, Agent, or Firm—Browdy and Neimark

(57) ABSTRACT

A method and device for frequency conversion of the radiation of a pulsed optical parametric oscillator (OPO) through sum or difference frequency mixing of a pulsed laser pump radiation with an OPO radiation, where the frequency mixing is integrated into the OPO resonator (1). The method permits the use of OPOs with high conversion efficiency in spectral ranges for scientific, technical and medical applications.

41 Claims, 1 Drawing Sheet

METHOD OF FREQUENCY CONVERSION OF THE RADIATION OF A PULSED OPTICAL PARAMETRIC OSCILLATOR (OPO) AND DEVICE FOR EXECUTING THE METHOD

FIELD OF THE INVENTION

The invention relates to a method of frequency conversion of the radiation of a pulsed optical parametric oscillator (OPO). It also relates to sum or difference frequency mixing in an optically nonlinear crystal. In addition, the invention relates to the use of a nonlinear OPO crystal pumped through a pulsed laser-pump radiation.

REVIEW OF RELATED TECHNOLOGY

Pulsed optical parametric oscillators having pulses in the nanosecond range ($10^{-9}$ s) are coherent radiation sources that can be tuned over a wide wavelength range and have high average powers and high pulse energies in the visible and near-infrared spectral range. With the methods of frequency conversion in optically non-linear crystals, it is possible to expand the spectral range of OPOs into spectral ranges of interest for many scientific, technical and medical applications.

Frequency doubling (SHG, Second Harmonic Generation), sum frequency mixing (SFM) and difference frequency mixing (DFM) are available as nonlinear processes for the frequency conversion of OPO radiation for expanding the spectral range. In this connection, see, for example, the book by V. G. Dmitriev, G. G. Gurzadyan, D. N. Nikogosyan, "Handbook of Nonlinear Optical Crystals," Springer Verlag [publisher], Berlin, Heidelberg, N.Y., 1997, which is incorporated herein by reference.

These processes are characterized by the second-order nonlinear susceptibility in nonlinear optical materials. A coupling occurs among three waves whose angular frequencies (of the generated wave $\omega_{new}$, the OPO wave $\omega_{OPO}$, and the so-called pump wave $\omega_p$) must correspond to the energy conservation condition:

$$\omega_{neu} = \omega_p \pm \omega_{OPO} \quad (1)$$

If the sign is positive, sum frequency mixing (SFM) or "up-conversion" is taking place. If the sign is negative, difference frequency mixing (DFM) or "down-conversion" is taking place. The special case of $\omega_p = \omega_{OPO}$ is referred to as frequency doubling (SHG) or "Second Harmonic Generation."

In the idealized case of interaction of plane waves, the power of the generated wave $P_{new}$ can be written as an approximation:

$$P_{neu} = \frac{8\pi d_{eff}^2 L^2 P_p P_{OPO}}{\varepsilon_0 c n_{neu} n_p n_{OPO} \lambda_{neu}^2 A} \sin^2\left(\frac{|\Delta k|L}{2}\right). \quad (2)$$

Here $d_{eff}$ represents the effective nonlinear coefficient, L represents the crystal length, P represents the powers of the pump and OPO radiation, $s_0$ represents the dielectric constant, c the speed of light in a vacuum, n the refractive index of the involved waves, $\lambda_{new}$ the wavelength of the generated wave, A the beam area and $\Delta k$ the wave vector difference. The following applies for the power of a pulsed radiation having the pulse duration $\tau$ and the energy E: $P = E/\tau$.

The nonlinear frequency conversion is the most efficient when the wave vector difference becomes zero. This is referred to as phase matching.

The conversion efficiency $\eta$ is defined by:

$$\eta = \frac{P_{neu}}{\sqrt{P_p P_{OPO}}}. \quad (3)$$

It is readily apparent that the power of the generated radiation is a function of the product of the powers of the radiated waves.

The standard external frequency conversion (i.e., frequency conversion occurring outside of the resonator) is a conventional technology that has been used frequently for lasers, but also for OPOs. This technology is known in connection with OPOs from the essay by G. Haub, M. J. Johnson and B. J. Orr, "Spectroscopic and Nonlinear-Optical Applications of a Tunable β-Barium Borate Optical Parametric Oscillator," J. Opt. Soc. Am. B 10, 1765 (1993). From the paper by J. Clark, B. Johnson and V. Newell, "Frequency Doubling of Narrowband High Energy Optical Parametric Oscillators," Proc. SPIE 2379, 256 (1995), it is known that products in which an external frequency doubling of OPOs is used are already commercially available.

The known methods have considerable disadvantages, however. A high conversion efficiency of the nonlinear frequency conversion is desirable, because it contributes significantly to the overall efficiency of the light source, that is, the ratio of the used electrical power to the generated light power. A higher overall efficiency means a higher light efficiency with the same power, or an energy savings with comparable output values. Therefore, a lower outlay for machinery and more cost-effective operation are usually attained, which also results in lower initial costs.

In theory, conversion efficiencies of 100% can be attained with the aid of nonlinear frequency conversion. In practice, however, the attained conversion efficiencies tend to be far lower. Numerous reasons account for this fact:

Normally, real beams cannot be described by ideal, plane wave fronts. The temporal and spatial coherence of pulsed radiation sources, particularly OPOs, is often comparatively poor.

Only a portion of the incident radiation is converted if the pulse lengths of the beams to be mixed are either different or have timing jitter.

Because nonlinear frequency conversion necessarily places many demands on a suitable nonlinear material (e.g. transparency or low internal losses, the possibility of phase matching, high optical, mechanical and thermal damage thresholds, etc.), usually not all properties can be optimized. Often, technological limits are also established. Thus, crystals frequently cannot be produced with high optical quality or with larger dimensions.

The crystals that are suitable for nonlinear frequency conversion have so-called acceptance bandwidths for the divergence and the spectral width of the radiation. These acceptance bandwidths decrease as the crystal length increases. As a result, in divergent or spectrally-broadband radiation sources, only a portion of the incident radiation can be used for nonlinear frequency conversion. This means that limits are placed on the focussing of the incident radiation for increasing the power density. Pulsed OPOs are spectrally-broadband if no special devices have been implemented to reduce their spectral width, and are frequently comparatively divergent.

A further disadvantage of OPOs having conventional external frequency conversion is the energy stability, which is generally clearly worse than that of the pump source.

Moreover, the beam quality and the divergence of OPOs having a conventional external frequency conversion, particularly frequency doubling, are often inadequate for applications.

For pulsed OPOs, there is only one description of an experimental setup for the special case of frequency doubling (SHG) that is integrated into the resonator: L. R. Marshal, A. Kaz, O. Aytur, "Continuously Tunable Diode-Pumped UV-Blue Laser Source," Opt. Lett. 18, 817 (1993). Furthermore, theoretical calculations have been proposed for the integrated sum frequency mixing of continuous-wave (cw) or cw-modelocked OPOs on the basis of a plane wave model; see G. T. Moore, K. Koch, "Optical Parametric Oscillation with Intracavity Sum-Frequency Generation," IEEE J. Quantum Electron. QE29, 961 (1993).

OBJECTS AND SUMMARY OF THE INVENTION

It is the object of the invention to provide a method and a device for nonlinear frequency conversion of the radiation of a pulsed optical parametric oscillator with a high conversion efficiency and better energy stability, with the beam quality and the divergence of the OPO satisfying the requirements set by applications.

In accordance with the invention, this object is accomplished in a method of the type mentioned above in that the frequency mixing is integrated into the OPO resonator. According to the invention, the basis of the proposed method and device is the integration of frequency mixing into the OPO resonator. In contrast to the conventional external frequency mixing, the method and the device for executing the method lead to an increase in the conversion efficiency of the nonlinear frequency conversion of the radiation of pulsed optical parametric oscillators.

The use of a frequency mixing that is integrated into the OPO resonator is associated with the following advantages for increasing the conversion efficiency:

Because the conversion efficiency depends on the power of the OPO radiation, the utilization of the high power internal to the OPO resonator leads to a higher efficiency of the nonlinear frequency conversion. Therefore, high conversion efficiencies can be attained with shorter interaction lengths of the nonlinear material. This in turn permits the more efficient, nonlinear frequency conversion of spectrally-broadband radiation due to the larger acceptance bandwidth. In many instances, frequency-selective elements are no longer necessary for narrowing the spectral width of the OPO radiation or the pump radiation. At the same time, shorter crystals are also less expensive.

Because of the boundary conditions presupposed by the resonator, the beam profile or the divergence of the OPOs embodied corresponding to the invention results in a better coupling of the involved waves.

Moreover, in this method, the energy stability is improved over the conventional method because of the nonlinear mechanism of the coupling out of the resonator. The beam properties (beam profile, divergence) in this method are also improved over the conventional method.

For lasers, a frequency conversion that is integrated into the laser resonator, primarily in connection with frequency doubling (SHG), is described in the scientific literature, and has also been implemented successfully.

In contract, the use of the frequency conversion of OPOs that is integrated into the resonator is clearly distinguished from the laser because it involves not only one, but two nonlinear processes, namely parametric oscillation and frequency mixing, that are coupled inside the resonator.

Following is an introduction, in systematic form, to the technical procedure for constructing a device according to the invention.

The components required for realizing a device according to the invention are disclosed below in outline format:
1. A suitable pulsed pump laser that generates the pump radiation for the OPO.
   1.1 Best-suited are solid-state lasers or
   1.2 solid-state lasers whose fundamental wavelength was doubled, tripled or quadrupled in frequency.
   1.3 Diode-laser-pumped pump laser systems can be advantageous because of their high efficiency.
2. A suitable pulsed pump laser that generates the pump radiation for the frequency mixing.
   2.1 Best-suited are solid-state lasers or
   2.2 solid-state lasers whose fundamental wavelength was doubled, tripled, quadrupled or quintupled in frequency.
   2.3 Diode-excited pump laser systems can be advantageous because of their high efficiency.
   2.4 In particular, this laser can be identical to the laser described in Section 1.
3. An OPO resonator, comprising:
   3.1 One or more crystals that is/are suitable for parametric oscillation. The phase-matching condition can be satisfied through angular-phase matching, temperature-phase matching, electro-optical phase matching or quasi-phase matching. In angular-phase matching, two crystals offer the option of compensating the beam walk-off (offset).
   3.2 One or more crystals that is/are suitable for nonlinear frequency conversion. The phase-matching condition can be satisfied through angular-phase matching, temperature-phase matching, electro-optical phase matching or quasi-phase matching. In angular-phase matching, two crystals offer the option of compensating the beam walk-off. The following processes are considered for frequency mixing:
      3.2.1 sum frequency mixing, and
      3.2.2 difference frequency mixing.
   3.3 A resonator for the OPO radiation. The resonator can be resonant for the signal or idler radiation.
   3.4 A device for coupling in the OPO pump radiation. This can be effected with:
      3.4.1 one of the resonator mirrors, which must be provided with appropriate coatings;
      3.4.2 a mirror provided expressly for this purpose inside the resonator; or
      3.4.3 dispersive elements, such as a prism.
   3.5 A device for coupling in the pump radiation for the frequency mixing. This can be effected with:
      3.5.1 one of the resonator mirrors, which must be provided with appropriate coatings;
      3.5.2 a mirror provided expressly for this purpose inside the resonator; or
      3.5.3 dispersive elements, such as a prism.
   3.6 A device for coupling out the radiation generated by frequency mixing. This can be effected with:
      3.6.1 one of the resonator mirrors, which must be provided with appropriate coatings;
      3.6.2 a special mirror; or
      3.6.3 dispersive elements, such as a prism.
   3.7 The OPO resonator can permit a single or double pass for the OPO pump radiation, and be embodied as:
      3.7.1 a linear resonator; or
      3.7.2 a ring resonator.
   3.8 To attain the highest-possible enhancement of the intra-cavity OPO radiation, the resonator should possess the highest-possible quality. In this regard, anti-reflection coatings on all crystal surfaces, or other measures for reducing the optical losses at the crystal surfaces, are advantageous.

4. A device for temporal synchronization of the pulses of OPO radiation and pump radiation for the frequency mixing. This device can be:
   4.1 an optical delay line; or
   4.2 if the lasers in Sections 1 and 2 are not identical, the synchronization can also be effected through an electronic delay of the laser pulses.

5. If the pump laser and pump wavelength for the OPO and the frequency mixing are identical, the beam steering can be effected by a beam splitter that splits the pump radiation into a) pump radiation for the OPO and b) pump radiation for the frequency mixing.
   5.1 It is especially advantageous to use a variable polarization beam splitter that permits the optimization of the ratio between the pump radiation for the OPO and the pump radiation for the frequency mixing in order to attain the highest-possible conversion efficiency.
   5.2 A polarization-independent beam splitter can also effect the splitting.

6. If the special case of frequency doubling is selected for the frequency mixing integrated into the resonator, no further pump radiation is required in addition to the pump radiation for the OPO. For this case, Sections 2, 3.5, 4 and 5 are omitted.

7. It is proposed to use the method of "injection seeding" to generate a spectral-narrow-band, frequency-converted radiation. Suitable narrow-band radiation sources are considered for this method. Radiation sources based on diode lasers are especially well-suited.

BRIEF DESCRIPTION OF THE DRAWING FIGURES

The invention and its principle re described by way of an advantageous embodiment of a realized OPO device, with reference to the drawing, wherein.

DETAILED DESCRIPTION OF THE PREFERRED EMBODIMENT

Here, and in the following claims, "OPO" stands for "optical parametric oscillator" or "optical parametric oscillation".

Figure 1:
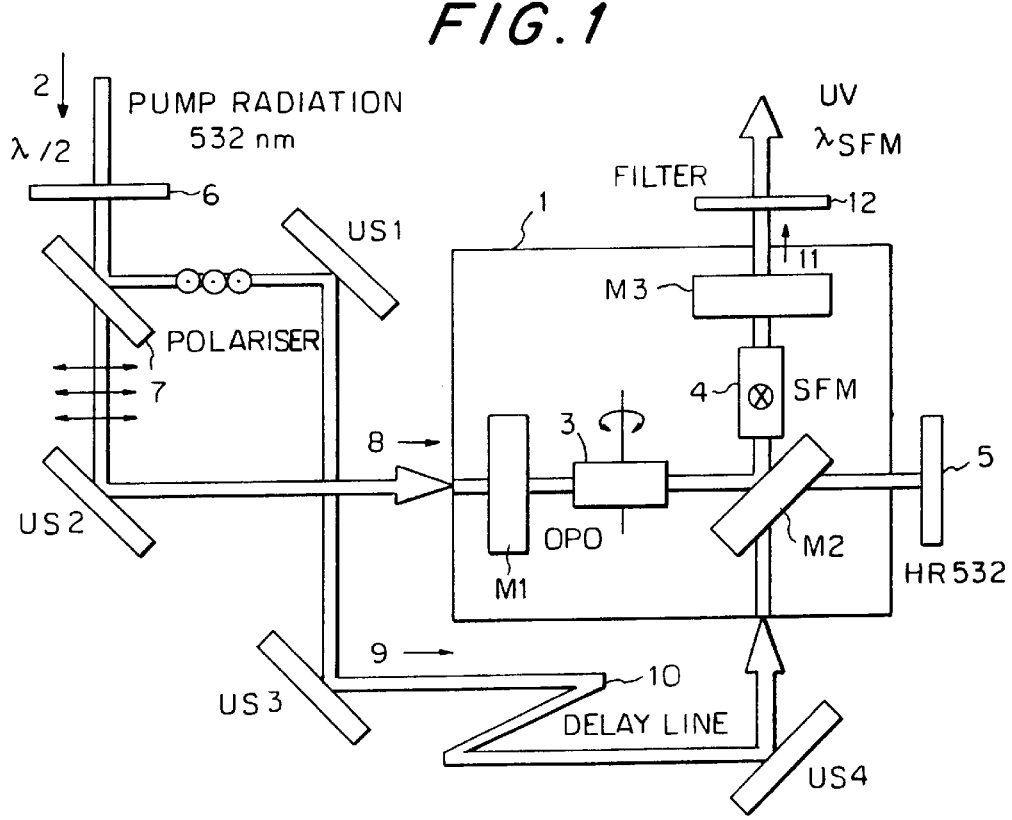
FIG. 1 is a schematic view of a device according to the invention.

FIG. 1 shows one preferred embodiment of a device of the invention for nonlinear frequency conversion of the radiation of a pulsed optical parametric oscillator 1, which permits the efficient generation of tunable radiation in the ultraviolet spectral range of 302–326 nm through the frequency mixing of OPO signal radiation (wavelength: 699–842 nm) and the frequency-doubled radiation of an Nd:YAG laser (the fundamental wavelength of a Nd:YAG laser is 1064; the second harmonic or doubled-frequency wavelength is nm 532 nm). If f is frequency, then frequency multiplying can include multiplying the fundamental frequency by an integer n, so that the multiplied frequency is 2f, 3f, 4f, and so on. A Q-switched, flashlamp-pumped Nd:YAG laser with frequency doubling ($\lambda_p$=532 nm) serves as the pump laser 2 for the OPO 1. The energy is 200 mJ/pulse with a wavelength of 532 nm.

The integrated OPO resonator 1 comprises an optically nonlinear KTP-OPO crystal 3, an optically nonlinear crystal 4 for a sum frequency mixing (SFM) and three mirrors M1, M2 and M3, which are highly-reflecting in the wavelength range of 700–830 nm and transmitting at 532 nm. The mirror M3 additionally transmits UV radiation in the range of 300–350 nm.

Here capital "M" denotes a frequency-selective mirror; "US" is used to denote an ordinary beam steering mirror.

A mirror 5 that is highly-reflecting for 532 nm (HR 532) effects a double pass of the pump radiation through the OPO crystal 3. The pump beam originating from the pump laser 2 is split into a p-polarized part and an s-polarized part with the aid of a half-wave plate 6 and a polarizer 7. The s-polarized beam 8 is used to pump the KTP-OPO crystal 3 in connection with the parametric operation. The p-polarized beam 9 reaches the OPO 1 via an optical delay line (delay path) 10, whose length is optimized for the temporal synchronization of the pulses, and serves as the pump for the sum frequency mixing.

The notable feature of this beam guidance, in which four beam steering mirrors US1, US2, US3 and US4 are provided, is that the ratio between the OPO pump energy and the SFM pump energy can be variably set and optimized with the half-wave plate 6. Hence, an integrated sum frequency mixing by means of the SFM crystal 4 occurs in the OPO 1. After exiting the OPO 1, the UV radiation 11 that has passed through and been coupled out by the mirror M3, the radiation having the wavelength $\lambda_{SPM}$ (wavelength range 300–350 nm), passes through a filter 12 specified for this UV wavelength range.

Figure 2:
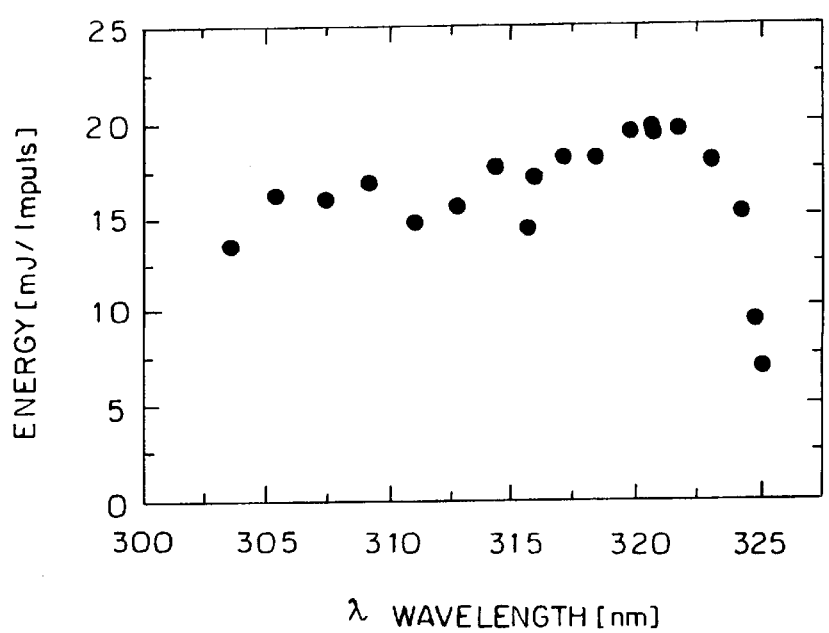
FIG. 2 is a graphical view of measured values of the output energy E of this OPO device as a function of the wavelength $\lambda$, with the total energy of the pump radiation being 205 mJ/pulse.

FIG. 2 shows, in points, the measured results of a measurement of the output energy E of this system as a function of the wavelength $\lambda$. According to this depiction, energies of up to 19.5 mJ are attained, which corresponds to a conversion efficiency of 9.5% with respect to the total energy at 532 nm.

A comparison test has revealed that the maximum attained conversion efficiency of the frequency conversion performed conventionally (externally) under comparable conditions was about 50% less than in the integrated conversion concept of the invention. A crystal that is twice as long is required to achieve this result in the conventional frequency conversion.

The energy stability of an OPO operating with an integrated frequency conversion according to the invention 25 was measured within the scope of a trial, and was comparatively good. It was determined to be within ±3.2%. The stability of the pump laser was only slightly better at ±2.2%.

Aspects of the present invention are explained in "Intracavity frequency mixing in pulsed optical parametric oscillators for the efficient generation of continuously tunable ultraviolet radiation", Appl. Phys. B 67, 331–338 (1998), by A. Fix and G. Ehret, which is entirely incorporated by reference herein.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention. Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

LIST OF REFERENCE CHARACTERS 1 optical parametric oscillator (OPO)
2 pump laser
3 OPO crystal
4 SFM crystal
5 highly-reflecting mirror
6 half-wave plate
7 polarizer
8 s-polarized beam
9 p-polarized beam
10 optical delay path M1, M2, M3 mirrors US1, US2, US3, US4 deflecting mirrors
11 UV radiation
12 filter

What is claimed is:

1. A method of frequency conversion of pulsed radiation, the method comprising:
   providing an OPO resonator including an optically nonlinear OPO crystal;
   providing an optically nonlinear frequency-mixing crystal;
   integrating the OPO resonator and the frequency-mixing crystal into an integrated resonator; and
   pumping the integrated resonator with pulsed laser pump radiation;
   whereby frequency conversion is accomplished through sum or difference frequency mixing of the pulsed laser pump radiation with OPO radiation obtained by parametric oscillation of the frequency-mixing crystal.

2. The method according to claim 1, wherein
   the laser pump radiation includes OPO pump radiation and frequency-mixing pump radiation both coupled into the integrated resonator, and wherein
   the OPO crystal comprises resonator mirrors (M1, M2, M3), and wherein
   radiation generated by the frequency mixing is coupled out of the integrated resonator.

3. The method according to claim 2, including generating the OPO pump radiation and the frequency-mixing pump radiation in a single pump laser.

4. The method according to claim 3, including beam splitting the laser pump radiation into OPO pump radiation and frequency-mixing pump radiation having the same wavelength.

5. The method according to claim 4, wherein the beam splitting includes separating by polarization, and permits an optimization of a splitting ratio between the OPO pump radiation and the frequency-mixing pump radiation for the frequency mixing.

6. The method according to claim 2, including a step of, in the OPO crystal for parametric oscillation, satisfying a phase-matching condition in the OPO resonator through angular-phase matching, temperature-phase matching, electro-optical phase matching or quasi-phase matching.

7. The method according to claim 2, including a step of, in the frequency-mixing crystal for the nonlinear frequency conversion, satisfying a phase-matching condition in the integrated resonator through angular-phase matching, temperature-phase matching, electro-optical phase matching or quasi-phase matching.

8. The method according to claim 1, including temporally synchronizing the pulses of the OPO radiation and the pump radiation for the frequency mixing.

9. The method according to claim 8, including effecting the synchronization by an optical delay line.

10. The method according to claim 8, including effecting the synchronization by an electronic delay of the laser pulses if a first pump laser used for the OPO pump radiation is not identical to a second pump laser used for the frequency mixing.

11. The method according claim 1, wherein, in a special case wherein the frequency mixing includes frequency doubling, only the OPO pump radiation is coupled into the OPO resonator, and no other pump radiation is coupled therein for the frequency mixing.

12. The method according to claim 1, comprising an injection seeding method generating a narrow-band, frequency-converted radiation, the narrow-band radiation sources optionally comprising diode lasers.

13. The method according to claim 1, including providing a second said crystal, and compensating a beam walk-off by an angular-phase matching of said crystals.

14. A device comprising
   (a) at least one pulsed pump laser that generates pump radiation for OPO resonance and for frequency mixing;
   (b) an integrated resonator further comprising
      an OPO resonator resonant for either signal or idler radiation and including at least one optically nonlinear OPO crystal for parametric oscillation,
      at least one optically nonlinear frequency-mixing crystal for nonlinear frequency mixing,
      a first device for coupling in OPO pump radiation, a second device for coupling in frequency-mixing pump radiation, and a third device for coupling output radiation generated by the frequency mixing out of the integrated resonator; and
   (c) a synchronizing device for temporal synchronization of pulses of the OPO pump radiation and pulses of the frequency-mixing pump radiation.

15. The device according to claim 14, comprising generating the OPO pump radiation with a solid-state laser.

16. The device according to claim 15, comprising multiplying a fundamental frequency of the solid state laser, whereby the frequency is frequency-doubled, frequency-tripled, and frequency-quadrupled.

17. The device according to claim 14, wherein the pulsed pump laser that generates the OPO pump radiation comprises a diode-laser-pumped pump laser system.

18. The device according to claim 14, wherein the pulsed pump laser that generates the frequency-mixing pump radiation for the frequency mixing comprises a solid-state laser.

19. The device according to claim 18, comprising multiplying a fundamental frequency of the solid state laser, whereby the frequency is at least frequency-doubled, frequency-tripled, and frequency-quadrupled, and so on.

20. The device according to claim 14, wherein the pulsed pump laser that generates the frequency-mixing pump radiation comprises a diode-laser-pumped pump laser system.

21. The device according to claim 14, wherein the at least one pulsed pump laser further comprises a first pump laser that generates the OPO pump radiation and a second pump laser that generates the frequency-mixing pump radiation, and the first pump laser and the second pump laser are substantially identical.

22. The device according to claim 14, wherein the first device for coupling in the OPO pump radiation comprises a mirror including an optical coating.

23. The device according to claim 14, wherein the first device comprises a resonator mirror disposed inside the integrated resonator for coupling in the OPO pump radiation.

24. The device according to claim 14, wherein the first device comprises an optically dispersive element.

25. The device according to claim 14, wherein the second device for coupling in the frequency-mixing pump radiation comprises a resonator mirror, including an optical coating.

26. The device according to claim 14, wherein the second device comprises a resonator mirror disposed inside the integrated resonator for coupling in the frequency-mixing pump radiation.

27. The device according to claim 14, wherein the second device comprises an optically dispersive element.

28. The device according to claim 14, wherein the third device, for coupling output radiation (11) generated by frequency mixing out of the integrated resonator, comprises a mirror including an optical coating.

29. The device according to claim 14, wherein the third device, for coupling output radiation (11) generated by frequency mixing out of the integrated resonator, comprises a special resonator mirror.

30. The device according to claim 14, wherein the third device comprises an optically dispersive element.

31. The device according to claim 14, wherein the OPO resonator allows a single pass of the OPO pump radiation.

32. The device according to claim 14, wherein the, OPO resonator allows a double pass of the OPO pump radiation.

33. The device according to claim 14, wherein the OPO resonator comprises a linear resonator and allows a single pass or a double pass of the OPO pump radiation.

34. The device according to claim 14, wherein the OPO resonator comprises a ring resonator and allows a single pass or a double pass of the OPO pump radiation.

35. The device according to claim 14, wherein all crystal surfaces comprise anti-reflection coatings or measures for optical loss reductions at the crystal surfaces, whereby a high quality of the integrated resonator is achieved.

36. The device according to claim 14, wherein the device for temporal synchronization of the pulses comprises an optical delay line.

37. The device according to claim 14, wherein the at least one pulsed pump laser comprises a plurality of non-identical pump lasers, and wherein the synchronizing device for temporal synchronization comprises an electronic delay device for delay of a laser pulse.

38. The device according to claim 14, comprising a beam splitter splitting the radiation into the OPO pump radiation and the frequency-mixing pump radiation, the beam splitter being disposed in a beam from the pump laser provided for both the OPO pump radiation and the pump radiation for the frequency mixing to the OPO resonator.

39. The device according to claim 38, wherein the beam splitter comprises a variable-polarization beam splitter for optimization of an intensity ratio between the OPO pump radiation and the frequency-mixing pump radiation.

40. The device according to claim 39, wherein the variable-polarization beam splitter further comprises a half-wave plate and a polarizer that splits the radiation into p-polarized and s-polarized radiation.

41. The device according to claim 38, wherein the beam splitter comprises a polarization-independent beam splitter.

* * * * *